March 28, 1961 K. P. CONGDON 2,977,487

INCREMENTAL SENSOR

Filed Nov. 13, 1959 2 Sheets-Sheet 1

INVENTOR.
KENNETH P. CONGDON
BY Darby + Darby
ATTORNEYS

March 28, 1961 K. P. CONGDON 2,977,487

INCREMENTAL SENSOR

Filed Nov. 13, 1959 2 Sheets-Sheet 2

INVENTOR.
KENNETH P. CONGDON
BY
Darby & Darby
ATTORNEYS 2,977,487
Patented Mar. 28, 1961

2,977,487

INCREMENTAL SENSOR

Kenneth P. Congdon, Cincinnati, Ohio, assignor to Avco Corporation, Cincinnati, Ohio, a corporation of Delaware Filed Nov. 13, 1959, Ser. No. 852,640

1 Claim. (Cl. 307—88.5)

Figure 1:
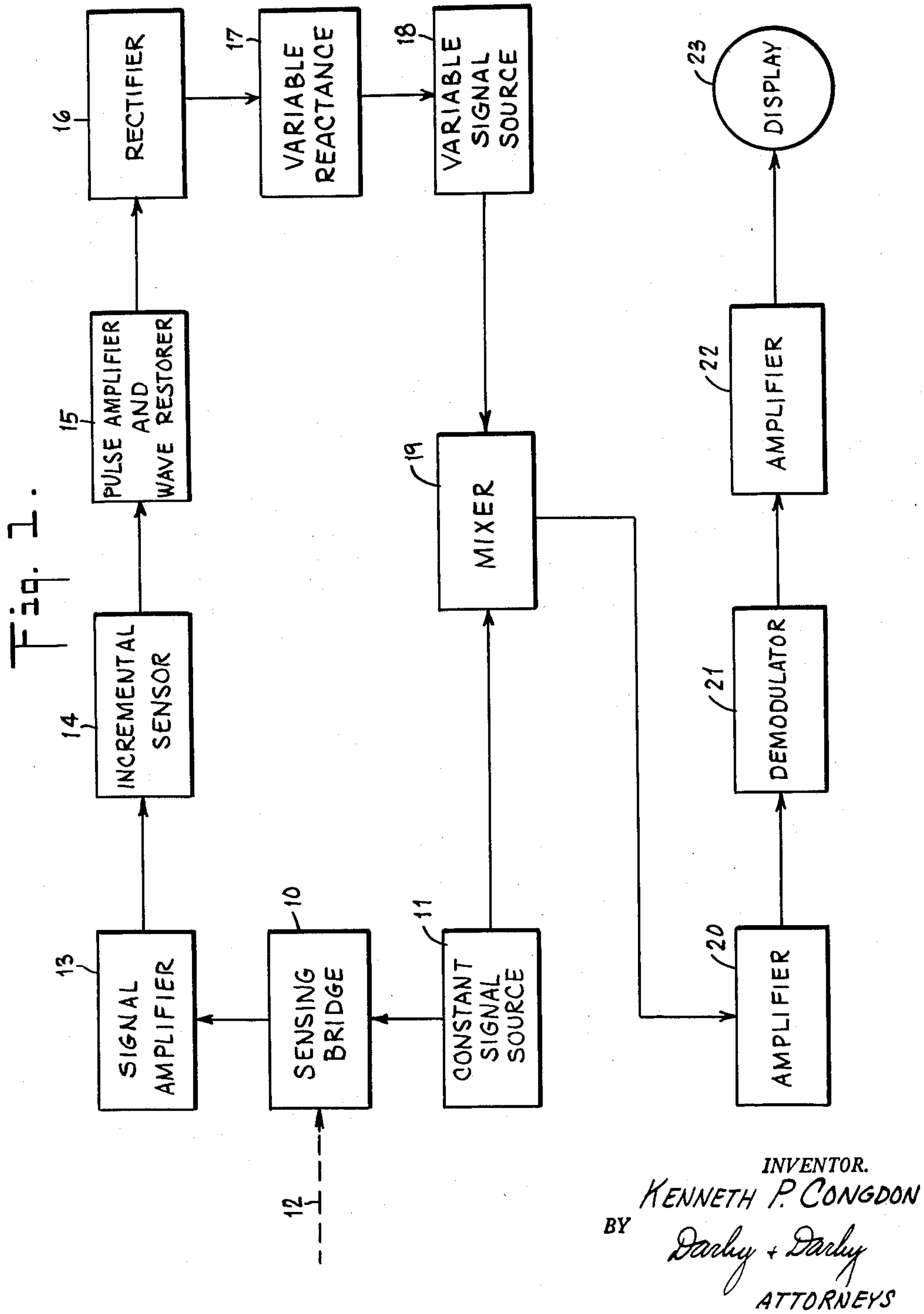

This invention relates to error sensing systems, and more particularly to a novel incremental sensing circuit which is especially adapted for the sensing of extremely small signal variations.

In many applications, such as buried object detecting systems, for example, it is often necessary to sense changes in input signal level of a very low order and to produce an output error signal which represents the deviation of the input signal level from a desired standard. When the input signals to be detected are A.C. signals of varying amplitude, diode detectors are often utilized to provide a D.C. output signal which is a function of the modulation envelope of the input signal and hence represents the variation in amplitude of the input signals. Unfortunately, detectors of this type are limited in their sensitivity with respect to low level variations of the input signals. For example, the production of a sizeable D.C. component during the rectification process serves to change the operating point of the diode, so that accurate sensing of small variations is not obtained. Furthermore, it is believed to be well known that diode detectors are not readily adapted for transistorized circuitry, since transistorized circuitry by nature requires a relatively low impedance drive and provides an inefficient load for diode detectors.

Accordingly, it is an object of this invention to provide a novel incremental sensing circuit which is extremely sensitive to small variations in applied input signals.

It is a further object of this invention to provide an incremental sensing circuit which is especially adapted for use with transistorized circuitry and which is capable of relatively high radio frequency operation.

It is a still further object of this invention to provide an error sensing system which is extremely sensitive to small variations in applied input signal levels and which permits the detection of signals above or below a selected level.

It is an additional object of this invention to provide an improved method of detecting an amplitude modulated wave.

Briefly, the invention contemplates the use of wave follower gating means to pass predetermined peak portions of the input signal containing the range of variations of the signal and means for amplifying and shaping the gated peak portions to produce a related output signal. In a preferred embodiment of the invention adapted to sense amplitude modulated input signals, for example, the wave follower gating means comprises a reversely biased semiconductor diode having a load circuit time constant substantially smaller than the period of the applied input signal to be sensed. By virtue of this arrangement, the diode acts as a "gate" to pass only a selected peak portion of the input signal containing the range of amplitude variations of the signal. The extremely small time constant of the load circuit enables the diode to act as a wave follower, so that the gated peak portions of the input signal are faithfully reproduced at the output of the diode. The gated peak portions of the input signal are then amplified and shaped in a transistor amplifier to produce a related amplitude modulated output signal of increased percentage modulation which may be directly applied to a demodulator or other device if desired. Since the related amplitude modulated output signal from the transistor amplifier is of increased percentage modulation, it may easily be demodulated by any of the known rectifier demodulators without loss of sensitivity. Furthermore, the gating action of the diode sensor permits the use of the sensing circuit in applications where it is desired to eliminate unwanted signals below a certain level, for example, in applications where a noise level is to be eliminated.

Figure 2:
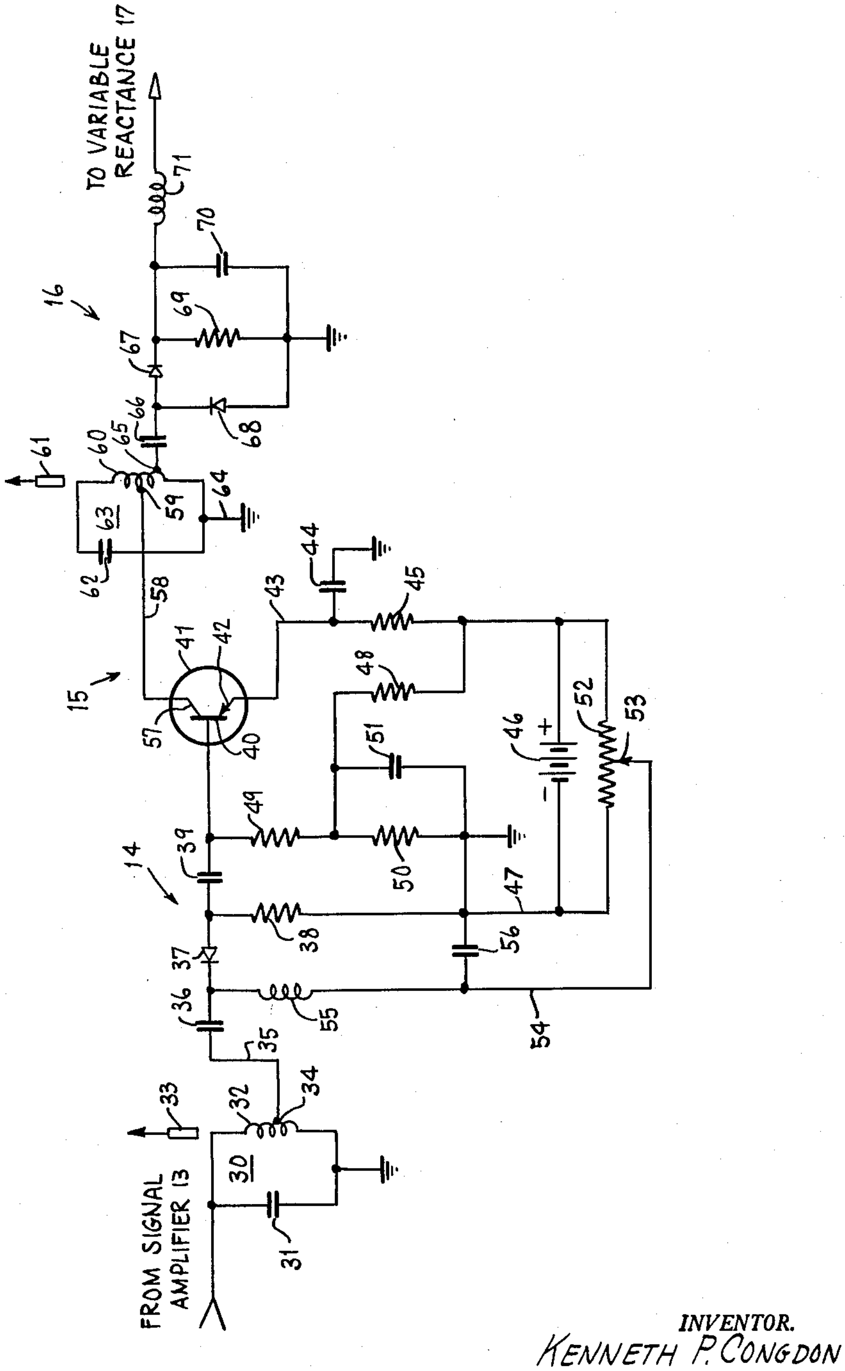

In the drawings:

Fig. 1 is a block diagram of an error sensing system employing the incremental sensing circuit of the invention; and Fig. 2 is a schematic diagram showing the circuit details of the incremental sensing circuit of Fig. 1.

Referring now to Fig. 1 of the drawings, there is shown a sensing bridge 10 which is energized by a constant signal source 11. The sensing bridge 10 may comprise any of the well known types of electrical bridges which are capable of being unbalanced by the variation of one of the circuit elements forming the arms of the bridge. In the arrangement of Fig. 1, the bridge is maintained in an unbalanced state, so that an output signal of constant amplitude is normally produced. As indicated schematically by the dotted arrow 12, the bridge is actuated by a condition to be sensed, so that variations in the condition tend to balance or to further unbalance the bridge depending upon their direction. This arrangement permits the bridge to sense condition responsive signals having bipolar characteristics. The output signal from the bridge 10 is then a condition responsive amplitude modulated signal which represents the variations in the condition being sensed. This signal is applied to a signal amplifier 13 which amplifies the signal to a value suitable for application to the incremental sensor 14. The incremental sensor 14, which will be more fully described hereinafter, gates a selected peak portion of the input signal applied to it containing the range of amplitude variations of the signal which represent the variations in the condition being sensed. The output pulses or peak portions from the sensor 14 are then applied to a pulse amplifier and wave restorer 15 which serves to amplify and shape the output pulses, so that the energy content of the wave is restored.

In the application of the invention illustrated, the output signal from the pulse amplifier 15, which is a related amplitude modulated signal of increased percentage modulation, is demodulated by a rectifier 16 to obtain a D.C. component suitable for controlling a variable reactance 17. The variable reactance 17 may in turn be used to control the output of a variable signal source 18. For example, if desired, the variable reactance 17 may comprise a saturable reactor in the tank circuit of a controlled oscillator forming the variable signal source 18. Therefore, the output from the variable signal source 18 would be a signal having a frequency varying in response to the variations of the condition being sensed. This signal is heterodyned with a constant frequency signal obtained from signal source 11 in a conventional mixer 19, to produce an output signal having a frequency representing the difference or "beat" frequency between the two signals applied to the mixer. The difference frequency signal which may be an error signal representing the deviation of the condition being sensed from a predetermined standard, is amplified by an amplifier 20 and applied to a demodulator 21 to recover a signal proportional to the difference frequency.

The output of demodulator 21 is then applied to an amplifier 22 which provides sufficient energy to drive a display or indicating device 23. If desired, the output signal from amplifier 22 could be employed for other purposes, such as a control signal in a regulating system, for example. Furthermore, it will be understood that the sensing bridge 10 may provide indications of other parameters, such as phase, for example.

Fig. 2 of the drawings illustrates the active circuitry involved in the incremental sensing circuit of the invention. As seen therein, the varying amplitude signals from amplifier 13 are applied to a tuned circuit 30 comprising capacitor 31 and variable inductance 32. The value of the variable inductance 32 may be controlled in a known manner by the position of a tuning slug 33. In accordance with known design techniques, the tuned circuit 30 may be made to exhibit impedance transformer characteristics, so that a low impedance is presented to the input of the incremental sensor 14. The amplitude modulated signal appearing across tuned circuit 30 is applied to the incremental sensor by means of a tap 34 on inductance 32, a lead 35 and a coupling capacitor 36. The incremental sensing circuit includes a series diode 37 which is preferably of the semiconductor type and a load resistor 38 which is connected to ground. The output of diode 37 is coupled to the base element 40 of a transistor 41 by means of a coupling capacitor 39. As illustrated, the transistor 41 is connected in a base input-grounded emitter circuit configuration and functions as the pulse amplifier 15. The transistor itself may, for example, comprise a PNP alloy junction germanium transistor. The emitter element 42 of the transistor is connected by a lead 43 and an emitter resistor 45 to the positive side of a source 46 of D.C. supply voltage. The emitter resistor 45 is bypassed in the usual manner by a capacitor 44 to prevent excessive signal degeneration.

The negative side of the D.C. supply source 46 is connected to ground by a lead 47, so that the source 46 functions as the supply voltage source for the transistor amplifier 15. A resistor 48 is connected between the circuit junction of resistor 45 and the supply source 46 and the circuit junction of resistors 49 and 50 which are connected between the base element 40 of the transistor and ground. A bypass capacitor 51 is shunted across the resistor 50. The resistors 48 and 50 function as a voltage divider across D.C. supply source 46, while resistor 49, which is connected to the circuit junction of resistors 48 and 50, serves as a base bias resistor. A potentiometer 52 having a movable tap 53 is shunted across the D.C. supply source 46. The tap 53 is connected by a lead 54 and an inductance 55 to the input of the series diode 37. A bypass capacitor 56 is coupled between ground and the tap 53 of the potentiometer. With the polarities of the D.C. supply source 46 and the diode 37 as illustrated, the diode 37 is reversely biased, so that only signal levels exceeding a predetermined value are passed. Furthermore, the circuit parameters of the diode load circuit, including resistor 38, are so chosen that the circuit is caused to have a time constant substantially smaller than the period of the amplitude modulated wave being sensed. A time constant of this order of magnitude, for example, fractions of microseconds, does not permit the building up of a D.C. component of rectification across the resistive parameters of the diode load circuit which might change the operating point of the diode. Accordingly, the diode 37 acts as a wave follower and passes a peak portion of the applied input signal as determined by the setting of the potentiometer 52. For example, if the applied input signal to the diode is a sine wave of varying amplitude, the output of the diode would be a series of pulses constituting the peak portions of the sine wave for one polarity. Therefore, the diode acts as a gate to pass only a limited selected portion of the applied wave.

The collector element 57 of the transistor 41 is connected by a lead 58 to a tap 59 on a variable inductance 60. A movable tuning slug 61 is provided to adjust the inductance of element 60. A capacitor 62 is shunted across the inductance 60 to form a "tank" circuit 63 which is connected at one end to ground by a lead 64. The circuit parameters of the tank circuit 63 are chosen so that it functions as a "high Q" tank circuit. Basically, the amplifier and its associated tank circuit serve to amplify and shape the output pulses from the diode to restore the energy in the wave necessary to drive the demodulator 16 or other device. A tap 65 on the coil 60 serves to couple the output of the transistor amplifier 15 to the input of rectifier 16. As illustrated, the rectifier 16 is a conventional half-wave, voltage-doubler rectifier comprising capacitor 66, series diode 67, shunt diode 68, load resistor 69 and capacitor 70. If desired, the diodes 67 and 68 may be of the semiconductor type. The voltage-doubler rectifier functions in the usual manner to provide a D.C. component at its output which represents the envelope of the applied input wave of varying amplitude. Finally, the output from rectifier 16 is coupled to the variable reactance 17 by means of a choke coil 71 which acts to filter and remove the high frequency components from the output of the rectifier.

The operation of the circuitry hereinbefore disclosed will now be described assuming that the output signal from amplifier 13 constitutes an A.C. signal of varying amplitude, wherein the variations in amplitude represent the variations of the condition being sensed. This amplitude modulated signal wave is coupled to the input of the incremental sensing diode 37 through the impedance transformer circuit 30 and coupling capacitor 36. The inductance 55 in the bias circuit presents an impedance to the applied input signal but readily passes the D.C. bias to the diode input. As illustrated, the diode 37 functions to pass the negative-going peaks of the applied signal wave due to the polarity of the diode and the reversely applied bias from potentiometer 52. Since the time constant of the diode load circuit is made extremely small in comparison to the period of the applied input wave, the diode acts as a wave follower to transmit or "gate" the peak portions of the negative-going halves of the applied signal wave. When the variations in amplitude of the applied input wave are small, as in waves of low percentage modulation, the range of variations of amplitude of the wave are contained in the peak portions of the wave. Therefore, by gating only the peak portions of the wave containing the range of variations, the information carried by the wave is not destroyed or altered but is represented in the output pulses from the diode at a higher percentage modulation. Since signals exceeding a predetermined level only are passed by the diode, the incremental sensing diode may perform a "Q-circuit" function to eliminate unwanted noise levels and would be extremely useful, for example, in radio equipment where fringe signals are not wanted. The output from the sensing diode 37 then consists of negative-going pulses of low duty cycle relative to the applied input signal wave. These pulses are amplified and shaped in the transistor amplifier 15 to restore the energy content of the wave and permit its effective use. Since the amplitude of the output pulses from the sensing diode 37 determines the amplitude of the restored sine wave at the output of amplifier 15, a related amplitude modulated wave of higher percentage modulation is obtained having amplitude variations proportional to the amplitude variations of the input wave to the diode.

In the application illustrated, the related amplitude modulated wave produced by amplifier 15 is demodulated by rectifier 16 to obtain a D.C. component for control of the variable reactance 17 in the variable signal source 18. It will be understood, however, that the output signal from transistor amplifier 15 need not be rectified, but may be used with other devices if desired. Furthermore, it may be pointed out that the sensing circuit of the invention requires only a single adjustment, namely, the bias adjustment for the incremental sensing diode, for satisfactory operation, assuming, of course, that there is no automatic gain control associated with the amplifiers. Finally, the novel circuitry of the sensing diode and its associated transistor amplifier permits bias adjustment of the diode to be made at a very low impedance and a correspondingly short time constant, so that the system may be designed for relatively high RF operation.

It is believed apparent that many changes could be made in the above-described sensing system and many seemingly different embodiments of the invention constructed without departing from the scope thereof. For example, other types of diodes or amplifiers could be utilized rather than the types shown. Furthermore, other amplifier and sensing diode circuit configurations could be utilized. Accordingly, it is intended that all matter contained in the above description or shown in the accompanying drawings shall be interpreted as illustrative and not in a limiting sense.

What is claimed is:

An error sensing system comprising condition responsive bridge means for producing an amplitude-modulated signal wave in response to variations of a condition being sensed; wave follower gating means coupled to the output of said bridge means for gating peak portions of said signal wave having an amplitude exceeding a predetermined value, said peak portions of the wave containing the range of amplitude variations of the wave; said gating means comprising a series diode of the semiconductor type, an inductance, and an adjustable source of direct current bias voltage connected serially with said inductance across the input of said diode for reversedly biasing said diode to pass said peak portions of the amplitude-modulated signal wave; amplifier means comprising a transistor amplifier arranged in base input-grounded emitter circuit configuration and having a high-Q tank circuit in the collector circuit thereof; circuit means including a series capacitance and having a time constant substantially smaller than the period of the input signal wave for coupling the output of said diode to said amplifier means, whereby said amplifier means amplifies and shapes the gated peak portions of said signal wave to produce a related amplitude-modulated wave of increased percentage modulation having amplitude variations proportional to the amplitude variations of said signal wave; rectifier means coupled to the output of said amplifier means for demodulating said related amplitude-modulated wave; variable frequency oscillator means including variable reactance means in the frequency-determining circuit thereof, said variable reactance means being coupled to the output of said rectifier means for control thereby, so that the frequency of the output signals from said oscillator means is varied in response to the variations of the condition being sensed; a source of constant frequency signals; mixer means coupled to the output of said oscillator means and said source of constant frequency signals for heterodyning the variable frequency signals from said oscillator means with the constant frequency signals from said source to produce a variable frequency error signal; and demodulator means coupled to the output of said mixer means for producing an output error signal.

References Cited in the file of this patent

UNITED STATES PATENTS 2,739,191 Wisenbaker et al. ........ Mar. 20, 1956
2,801,332 Vos .................... July 30, 1957